(12) United States Patent
Paragyios

(10) Patent No.: US 7,391,882 B2
(45) Date of Patent: Jun. 24, 2008

(54) PRIOR KNOWLEDGE, LEVEL SET REPRESENTATIONS AND VISUAL GROUPING

(75) Inventor: Nikolaos Paragyios, Paris (FR)

(73) Assignee: Siemens Medical Solutions USA, Inc., Malvern, PA (US)

( * ) Notice: Subject to any disclaimer, the term of this patent is extended or adjusted under 35 U.S.C. 154(b) by 669 days.

(21) Appl. No.: 11/008,522

(22) Filed: Dec. 9, 2004

(65) Prior Publication Data

US 2005/0169533 A1 Aug. 4, 2005

Related U.S. Application Data

(60) Provisional application No. 60/540,129, filed on Jan. 29, 2004.

(51) Int. Cl.
*G06K 9/00* (2006.01)

(52) U.S. Cl. ..................... 382/103; 382/203; 348/14.1

(58) Field of Classification Search .............. 382/100, 382/103, 106, 123, 168, 171, 173, 181, 184, 382/209, 190–203, 219, 224, 232, 254, 274, 382/276, 305; 707/3; 348/14.1; 702/182, 702/181; 342/456

See application file for complete search history.

(56) References Cited

U.S. PATENT DOCUMENTS

| | | | |
|---|---|---|---|
| 6,031,935 A | | 2/2000 | Kimmel |
| 6,820,037 B2 * | | 11/2004 | Simon .................... 702/182 |
| 6,909,453 B2 * | | 6/2005 | Mochizuki et al. ......... 348/14.1 |
| 6,980,984 B1 * | | 12/2005 | Huffman et al. .............. 707/3 |
| 7,035,431 B2 * | | 4/2006 | Blake et al. ................ 382/103 |
| 7,132,982 B2 * | | 11/2006 | Smith et al. ................ 342/456 |

FOREIGN PATENT DOCUMENTS

| | | |
|---|---|---|
| DE | 103 04 360 A1 | 9/2003 |
| WO | WO 02/103618 A1 | 12/2002 |
| WO | WO 03/065294 A1 | 8/2003 |

OTHER PUBLICATIONS

N. Paragios et al., Matching Distance Functions: A Shape-To-Area Variational Approach for Global-to-Local ReAistration, European Conference on Computer Vision, pp. 11:775-790. (2002).*

S. Birchfield, *Elliptical Head Tracking Using Intensity Gradients and Color Histograms*, IEEE Conference on Computer Vision and Pattern Recognition, Jun. 1998, pp. 232-237.

Y. Boykov et al., *Fast Approximate Energy Minimization via Graph Cuts*, IEEE Transactions on Pattern Analysis and Machine Intelligence, vol. 23, pp. 1222-1239, Nov. 2001.

T. Chan, *Active Contours without Edges*, IEEE Transactions on Image Processing, vol. 10, No. 2, pp. 266-277, Feb. 2001.

(Continued)

*Primary Examiner*—Seyed Azarian

(57) ABSTRACT

A method for detecting an object in an image includes determining a shape model from aligned training examples, and implementing the shape model as a prior within a level set framework for determining the object in the image, wherein the level set framework determines a projection of the object in the image and a confidence measure along portions of the projection, the level set framework being constrained by the prior.

16 Claims, 5 Drawing Sheets

OTHER PUBLICATIONS

T.C. Cootes, et al., *A Unified Framework for Atlas Matching Using Active Appearance Models*, Information Processing in Medical Imaging, 1999, pp. 322-333.

D. Cremers, et al., *Diffusion-Snakes: Combining Statistical Shape Knowledge and Image Information in a Variational Framework*, IEEE Workshop in Variational and Level Set Methods, pp. 137-144, Jul. 2001.

N. Paragios, et al., *Non-Rigid Registration Using Distance Functions*, Computer Vision and Image Understanding, vol. 23, pp. 142-165, Oct. 2001.

M.E. Leventon, et al., *Statistical Shape Influence in Geodesic Active Contours*, IEEE Conference on Computer Vision and Pattern Recognition, pp. I:316-322, 2001.

Y. Wang, et al., *Boundary Finding with Correspondence Using Statistical Shape Models*, IEEE Conference on Computer Vision and Pattern Recognition, 1998, pp. 338-345.

N. Paragios et al., *Matching Distance Functions: A Shape-To-Area Variational Approach for Global-to-Local Registration*, European Conference on Computer Vision, pp. II:775-790, Jan. 2002.

N. Paragios, *Geodesic Active Regions: A New Framework to Deal with Frame Partition Problems in Computer Vision*, Journal of Visual Communication and Image Representation, vol. 13, pp. 249-268, Nov. 1999.

S. Kichenassamy, et al., *Gradient Flows and Geometric Active Contour Models*, IEEE International Conference in Computer Vision, pp. 810-815, Sep. 1994.

J. Kim et al., *Nonparametric Methods for Image Segmentation Using Information Theory and Curve Evolution*, IEEE Int'l. Conf. On Image Processing, Madison, WI, pp. 797-800, Sep. 2002.

M.E. Leventon et al., *Level Set Based Segmentation with Intensity and Curvature Priors*, IEEE Mathmatical Methods in Biomedical Image Analysis, pp. 4-11, 2000.

T. McInerney et al., *T-Snakes: Topology Adaptive Snakes*, Medical Image Analysis, vol. 4, pp. 73-91, Aug. 1999.

S. Osher et al., *Fronts Propagating with Curvature Dependent Speed: Algorithms Based on Hamilton-Jacobi Formulations*, Journal of Computational Physics, vol. 79, pp. 12-49, 1988.

M. Bertalmio et al., *Morphing Active Contours*, IEEE Trans. On Pattern Analysis and Machine Intelligence, vol. 22, No. 7, Jul. 2000, pp. 1-5.

N. Paragios et al., *Geodesic Active Regions for Supervised Texture Segmentation*, Proc. Of 7th IEEE Int'l. Conference in Computer Vision, Greece 1999.

S.C. Zhu et al., *Region Competition and its Analysis: A Unified Theory for Image Segmentation*, IEEE Trans. On Pattern Analysis and Machine Intelligence, vol. 18, pp. 884-900, 1995.

M. Rousson, et al., *Shape Priors for Level Set Representations*, European Conference on Computer Vision, Copenhagen, Denmark, pp. II:78-93, 2002.

M. Rousson, et al., *Active Unsupervised Texture Segmentation on a Diffusion Based Feature Space*, IEEE Conference on Computer Vision and Pattern Recognition, Jun. 18-20, 2003, Madison, WI, pp. 1-6.

D. Adalsteinsson, et al., *A Fast Level Set Method for Propagating Interfaces*, Journal of Computational Physics, vol. 118, pp. 269-277, Sep. 1994.

L.H. Staib, et al., *Boundary Finding with Parametrically Deformable Models*, IEEE Trans. On Pattern Analysis and Machine Intelligence, vol. 14, No. 11, Nov. 1992, pp. 1061-1075.

R.C. Veltkamp et al., *State-Of-The-Art in Shape Matching*, Technical Report UU-CS-1999-27, Utrecht University, 1997, pp. 1-26.

A. Yezzi et al., *Stereoscopic Segmentation*, IEEE Int'l. Conf. In Computer Vision, pp. I:56-64, 2001.

S.C. Zhu, *Region Competition: Unifying Snakes, Region Growing, and Bayes/MDL for Multi-Band Image Segmentation*, IEEE Trans. on Pattern Analysis and Machine Intelligence, vol. 18, pp. 884-900, Mar. 1995.

* cited by examiner

PRIOR KNOWLEDGE, LEVEL SET REPRESENTATIONS AND VISUAL GROUPING

This application claims priority to U.S. Provisional Application Ser. No. 60/540,129, filed on Jan. 29, 2004, which is herein incorporated by reference in its entirety.

BACKGROUND OF THE INVENTION

1. Technical Field

The present disclosure relates to object detection within images, and more particularly to a variational level set system and method for shape-driven knowledge-based object detection.

2. Discussion of Related Art

Recovering a particular structure of interest from an image that follows some predefined characteristics is useful for model-based image segmentation. Such characteristics may be visual or geometric. Visual properties may be captured by building global distributions to describe the luminance characteristics of the structure of interest or by creating local appearance models. Such models can be efficient in a constrained illumination scenario, where changes are minimal and can be captured by a model.

Shape-driven knowledge-based segmentation is an alternative to visual-driven techniques. Such methods aim to recover a structure that has consistent geometric form when compared to a prior model. Smoothness is an example of imposing a prior constraint. Local geometric properties (e.g., curvature, local smoothness constraints) can be used when defining such a prior model or a prior model may be defined in a more global manner leading to more concrete representations that capture the variance of the entire structure of interest. While local models are efficient, global representations are an appropriate approach to cope with occlusions, noise and changes on the object pose.

Modeling is needed prior of introducing global shape-driven constraints. Such task is equivalent with extracting a compact representation for the structure of interest from a set of training examples. The selection of representation is related to the form of prior that is to be introduced and is constrained by the size of the training set. Building complex models requires significant amount of ground truth. Registration of all examples to a common pose is an important part of the modeling phase. Correspondences for the basic elements of the samples of the training are to be recovered towards efficient modeling.

Shape-driven knowledge-based segmentation involves a wide variety of models. Use of geometric components, like straight segments and ellipsoids was an attempt to create a compact representation for modeling faces. While such models are efficient in terms of performance and low complexity when modeling simple geometric structures, they fail to account for local information and important variability of the object of interest. Given such model, segmentation is then performed through the adjustment of the local geometric components towards the desired image properties.

Other techniques includes deformable templates, active shape and appearance models, and snake models.

The application domain for level set methods in machine vision is wide and not restricted to image segmentation, restoration, tracking, shape from shading, 3D reconstruction, medical image segmentation, etc. These techniques were originated, studied and applied to other scientific domains like geometry, robotics, fluids, semiconductors designing, etc. Most of the mentioned applications share a common concern, tracking moving interfaces. Level set representations are well-suited computational methods to perform this task. They can be used for any dimension (e.g., curves, surfaces, hyper-surfaces, etc.), are parameter free and can change naturally the topology of the evolving interface. Moreover, they provide a natural way to determine and estimate geometric properties of the evolving interface.

These techniques can also deal with non-rigid objects and motions, since they refer to very local characteristics and can deform an interface pixel-wise. However, they can exhibit poor performance compared with parametric models when solid/rigid motions and objects are considered. Local propagations are sensitive and fail to take fully advantage of some a priori well-determined physical constraints like solid shape models.

Therefore, a need exists for a variational level set system and method for shape-driven knowledge-based object detection.

SUMMARY OF THE INVENTION

Modeling is an important to shape-driven segmentation techniques. According to an embodiment of the present disclosure, a stochastic level set formulation is implemented to account for prior knowledge in a variational level set method for shape-driven knowledge-based object extraction. To this end, objects are represented in an implicit form, using a stochastic distance function that exhibits degrees of confidence. Constraints on the segmentation process are imposed be seeking for a geometric structure in the image plane that belongs to the family of shapes generated by the prior model according to a similarity motion transformation. A non-stationary metric between the evolving contour and the model is minimized leading to motion equations that evolve this contour towards the desired image properties and update the registration parameters between with the prior model. Upon convergence, a structure that belongs to the manifold of eligible solutions and the corresponding transformation are recovered.

According to an embodiment of the present disclosure, a method for detecting an object in an image includes determining a shape model from aligned training examples, and implementing the shape model as a prior within a level set framework for determining the object in the image, wherein the level set framework determines a projection of the object in the image and a confidence measure along portions of the projection, the level set framework being constrained by the prior.

The training examples are aligned to a common pose.

Determining the shape model further comprises determining a level set presentation of the object in the image, determining the projection as a most prominent shape in the image, and determining the confidence measure along portions of the most prominent shape. The method further includes determining a steady state shape model by alternately determining the level set presentation of the object and the projection and confidence measure.

The projection and confidence measurement are defined in a pixel level of the image. The confidence measure is determined as a confidence map of the object, wherein the object is decomposed into the portions and a smoothness term is determined for each portion.

The level set framework comprises determining an intensity property for the object and a background in the image, and estimating mean and variance of the object and the background for a segmentation map.

The projection evolves on a zero-level and propagates in an inwards and outwards direction to a boundary of the object.

The prior is a stochastic prior. The stochastic prior introduces an error into the level set framework for deviating from the stochastic prior which decreases in areas with reduced confidence.

According to an embodiment of the present disclosure, a program storage device is provided readable by machine, tangibly embodying a program of instructions executable by the machine to perform method steps for detecting an object in an image. The method comprises determining a shape model from aligned training examples, and implementing the shape model as a prior within a level set framework for determining the object in the image, wherein the level set framework determines a projection of the object in the image and a confidence measure along portions of the projection, the level set framework being constrained by the prior.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present disclosure, level set representations are constrained to follow a shape global consistency while preserving the ability to capture local deformations. Global and local shape properties of the object are recovered.

Figure 1:
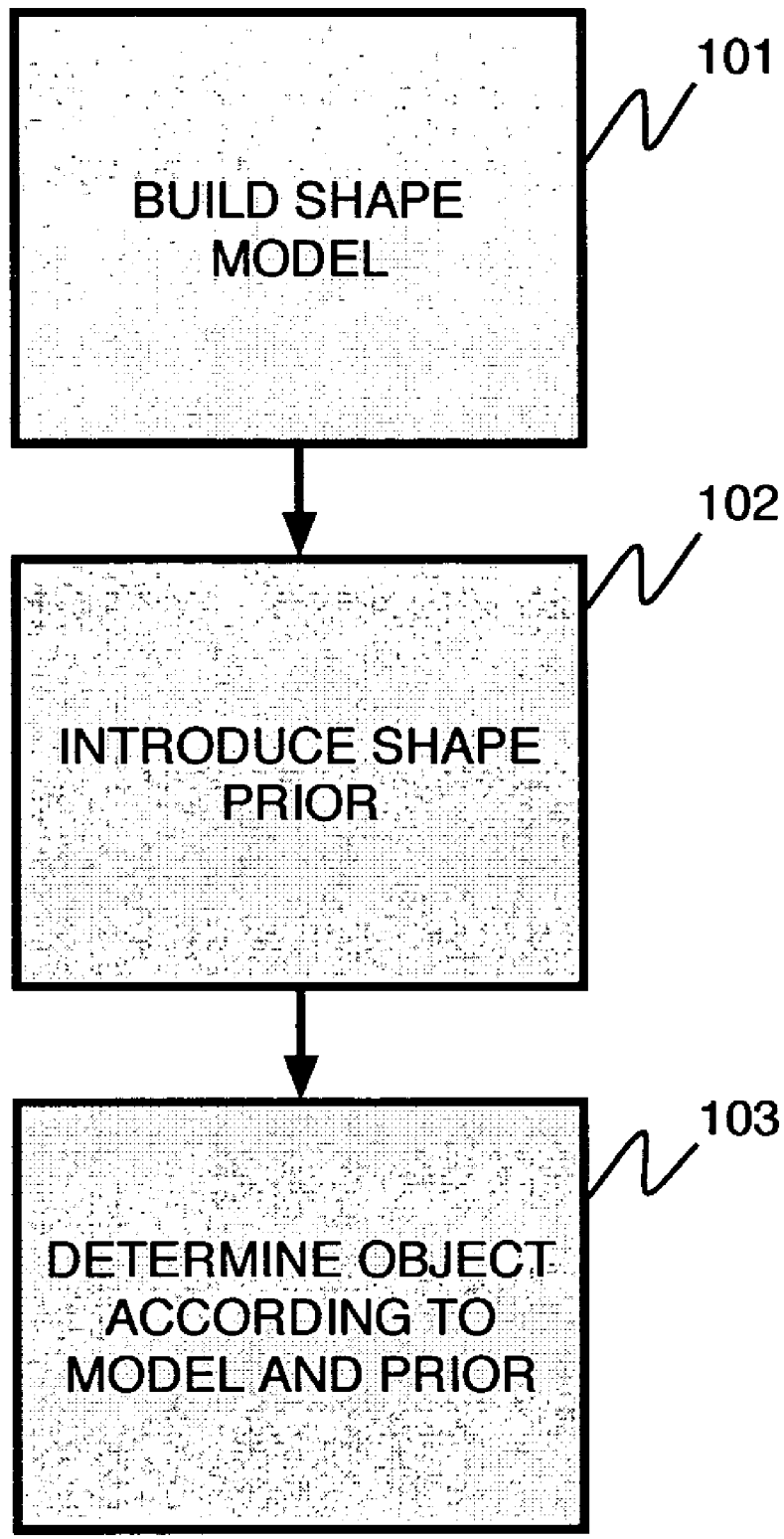
FIG. 1 is a flow chart of a method according to an embodiment of the present disclosure.

A shape model is built directly on the level set space using a collection of samples. Referring to FIG. 1, the shape model is constructed using a variational framework that creates a non-stationary pixel-wise level set representation that accounts for shape variability 101. The shape model is used as basis to introduce a shape prior in an energetic form 102. The shape prior minimizes a non-stationary distance between the evolving interface and the shape model deformed according to a similarity transformation to determine an object 103.

A system and method according to an embodiment of the present disclosure may be implemented as a module and integrated with existing data-driven variational methods to perform image segmentation for physically corrupted and incomplete data.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 2:
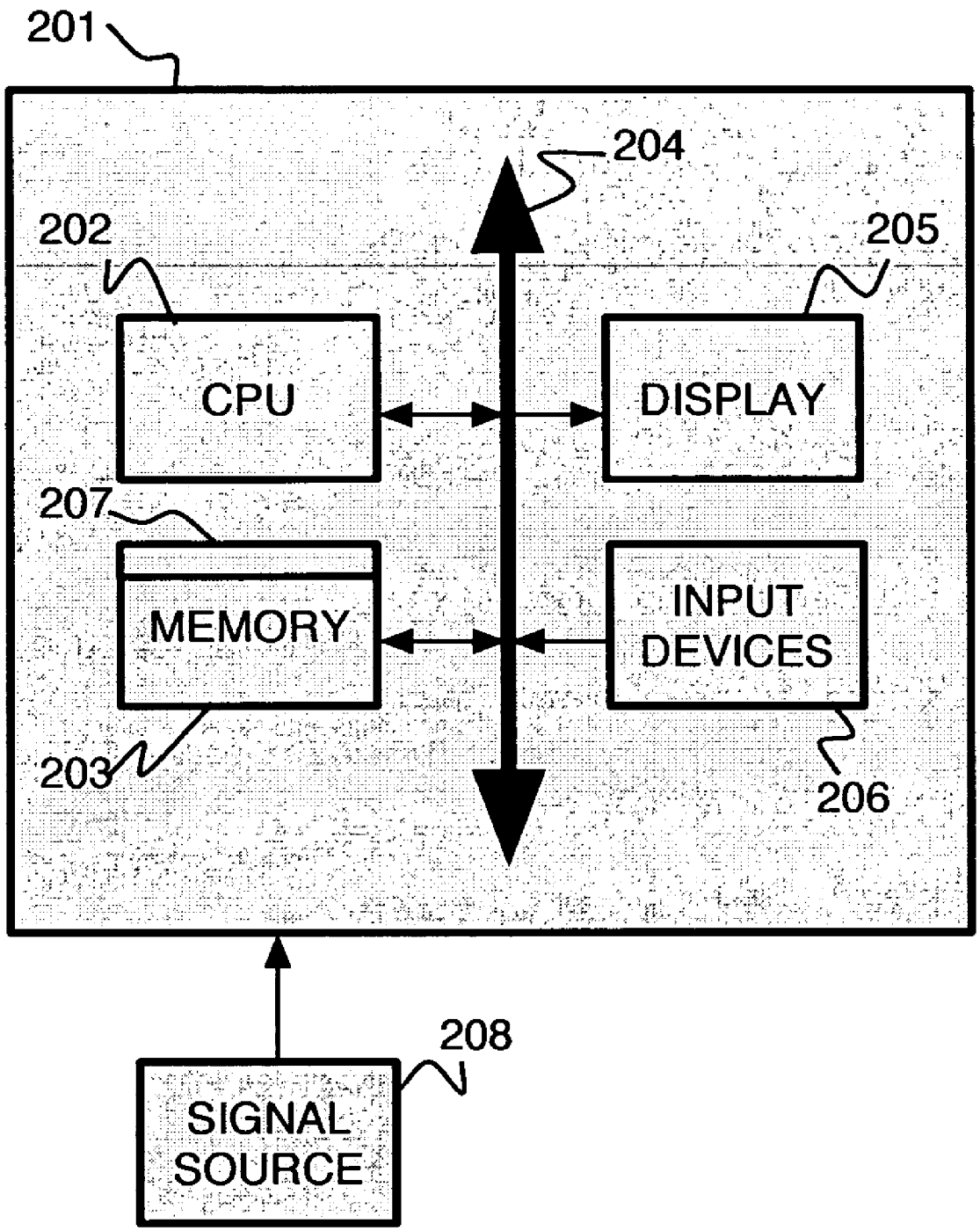
FIG. 2 is a diagram of a system according to an embodiment of the present disclosure.

Referring to FIG. 2, according to an embodiment of the present invention, a computer system 201 for implementing the present invention can comprise, inter alia, a central processing unit (CPU) 202, a memory 203 and an input/output (I/O) interface 204. The computer system 201 is generally coupled through the I/O interface 204 to a display 205 and various input devices 206 such as a mouse and keyboard. The support circuits can include circuits such as cache, power supplies, clock circuits, and a communications bus. The memory 203 can include random access memory (RAM), read only memory (ROM), disk drive, tape drive, etc., or a combination thereof. The present invention can be implemented as a routine 207 that is stored in memory 203 and executed by the CPU 202 to process the signal from the signal source 208. As such, the computer system 201 is a general purpose computer system that becomes a specific purpose computer system when executing the routine 207 of the present invention.

The computer platform 201 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Implicit Representations:

Segmentation may be performed using evolving interfaces (e.g., curves) according to a flow. The flow that governs the propagation of the curve may be recovered through the minimization of an objective function, or defined according to the application context (e.g., geometric flows). Snake-based segmentation approaches refer to the propagation of curves from an initial position towards the desired image characteristics. Such flows include internal and external terms.

To introduce level set representations, consider a parametric curve $$\partial R(p):[0,1] \to R \times R \qquad \text{EQ. 1}$$

that evolves according to a given motion equation in the normal direction N1:

$$\frac{d}{d\tau}\partial R(p) = \mathcal{F}(\partial R(p))\mathcal{N} \qquad \text{EQ. 2}$$

where F is a scalar function on the local properties of the curve (e.g., curvature). This flow may be implemented using a Lagrangian approach. The contour is represented in discrete form using a selection of control points. The curve position can be updated by solving Eq. 1 and Eq. 2 for each control point. Such technique in the most general case cannot change the topology of the evolving curve and a re-parameterization of the evolving curve may be needed.

The level set method was initially introduced in the area of fluid dynamics and is an emerging technique to cope with various applications in imaging, vision and graphics. Level set methods represent the evolving curve with the zero-level of a surface $\phi:[x,y,\phi(x,y)]$:

$$\phi(\partial R(p))=0 \qquad \text{EQ. 3}$$

Such a representation is implicit, intrinsic and parameter free. The surface can be evolved in such a way that the zero-level yields always to the evolving curve. Taking the derivatives of $\phi$ with respect to time gives:

$$\frac{d}{d\tau}\phi + \mathcal{F}|\nabla\phi| = 0 \qquad \text{EQ. 4}$$

Thus, establishing a connection between the family of evolving curves $\partial R$ and the family of evolving surfaces $\phi$. Such a propagation schema can account for topological changes and can provide support on the estimation of the local geometric properties of the curve.

Energy minimization techniques may be used a flow may be obtained and implemented in the level set space.

Defining objective functions in the level set space for grouping leads towards the establishment of level set techniques in imaging and vision. To this end, consider the distance transform $D(s,\partial R)$ as embedding function for $\partial R$:

$$\phi(x,y) = \begin{cases} D(s,\partial\mathcal{R}), & s \in \mathcal{R} \\ 0, & s \in \partial\mathcal{R} \\ -D(s,\partial\mathcal{R}), & s \in \Omega - \mathcal{R} \end{cases} \qquad \text{EQ. 5}$$

and the Dirac and Heaviside distributions:

$$\delta_\alpha(\phi) = \begin{cases} 0, & |\phi| > \alpha \\ \frac{1}{2\alpha}\left(1 + \cos\left(\frac{\pi\phi}{\alpha}\right)\right), & |\phi| < \alpha \end{cases} \qquad \text{EQ. 6}$$

$$H_\alpha(\phi) = \begin{cases} 1, & \phi > \alpha \\ 0, & \phi < -\alpha \\ \frac{1}{2}\left(1 + \frac{\phi}{\alpha} + \frac{1}{\pi}\sin\left(\frac{\pi\phi}{\alpha}\right)\right), & |\phi| < \alpha \end{cases}$$

and use them to introduce an image partition objective function. Smoothness constraints, boundary-driven object detection as well as general region-consistency grouping terms can now be introduced directly on the level set space $\phi$. Length minimization is a well-known geometric smoothness term that can be introduced in a straightforward manner using for example, the formulation:

$$E_{smoothness}(\phi) = \int\int_\Omega \delta_\alpha(\phi)|\nabla\phi|d\Omega \qquad \text{EQ. 7}$$

The geodesic active contour (Eq. 8) may be used to recover a minimal length curve $$E_{geodesic}(\phi) = \int\int_\Omega \delta_\alpha(\phi)b(;)|\nabla\phi|d\Omega \qquad \text{EQ. 8}$$

according to some arbitrary metric function $b:R^+ \to [0,1]$. Such function is monotonically decreasing with minimal values at the image locations with the desired features (e.g., high gradient). The calculus of variations, can provide a geometric flow to update the position of the interface towards the desired image properties:

$$\frac{\partial}{\partial\tau}\phi = \delta_\alpha(\phi)div\left(b(;)\frac{\nabla\phi}{|\nabla\phi|}\right) \qquad \text{EQ. 9}$$

Such flows can lead to precise boundary extraction under certain initial conditions. The starting point needs to substantially encircle the object of interest or be substantially surrounded by it. Furthermore, prior knowledge on the propagation direction is needed.

Regional/global information modules can be used for separating an object in an image from the background of the image using adaptive balloon forces for overcoming the need to satisfy initial conditions. The regional/global information module uses the evolving interface to define an image partition that is optimal with respect to some grouping criterion. Such criterion can be derived from the Heaviside distribution;

$$E_{regional}(\phi) = \underbrace{\int\int_\Omega H_\alpha(\phi)r_O(;)d\Omega}_{object} + \underbrace{\int\int_\Omega (1-H_\alpha(\phi))r_B(;)d\Omega}_{background} \qquad \text{EQ. 10}$$

according to some global descriptors $r_O:R^+ \to [0,1]$, $r_B:R^+ \to [0,1]$ that are monotonically decreasing functions. Such descriptors measure the quality of matching between the observed image and the expected regional properties of the structure of interest and the background. Such term can improve segmentation performance and make the approach less dependent from the initial conditions. The calculus of variations can lead to the following flow regarding the evolution of $\phi$:

$$\frac{\partial}{\partial\tau}\phi = \delta_\alpha(\phi)(r_B(;) - r_O(;)) \qquad \text{EQ. 11}$$

that is an adaptive balloon force. Such force is based on relative measurements and either expands or shrinks the curve according to the local fit of the data with respect to the expected intensity properties of the object and the background class.

Curve propagation through the use of implicit representations is an efficient segmentation tool. Precise extraction of boundaries, ability to deal with multi-component objects and integration of partition modules of different nature are strengths of such method. Quite often, segmentation is equivalent with recovering a structure of particular interest. Prior knowledge on the process may refer either to the visual properties of the object or to its geometric form.

Figure 4:
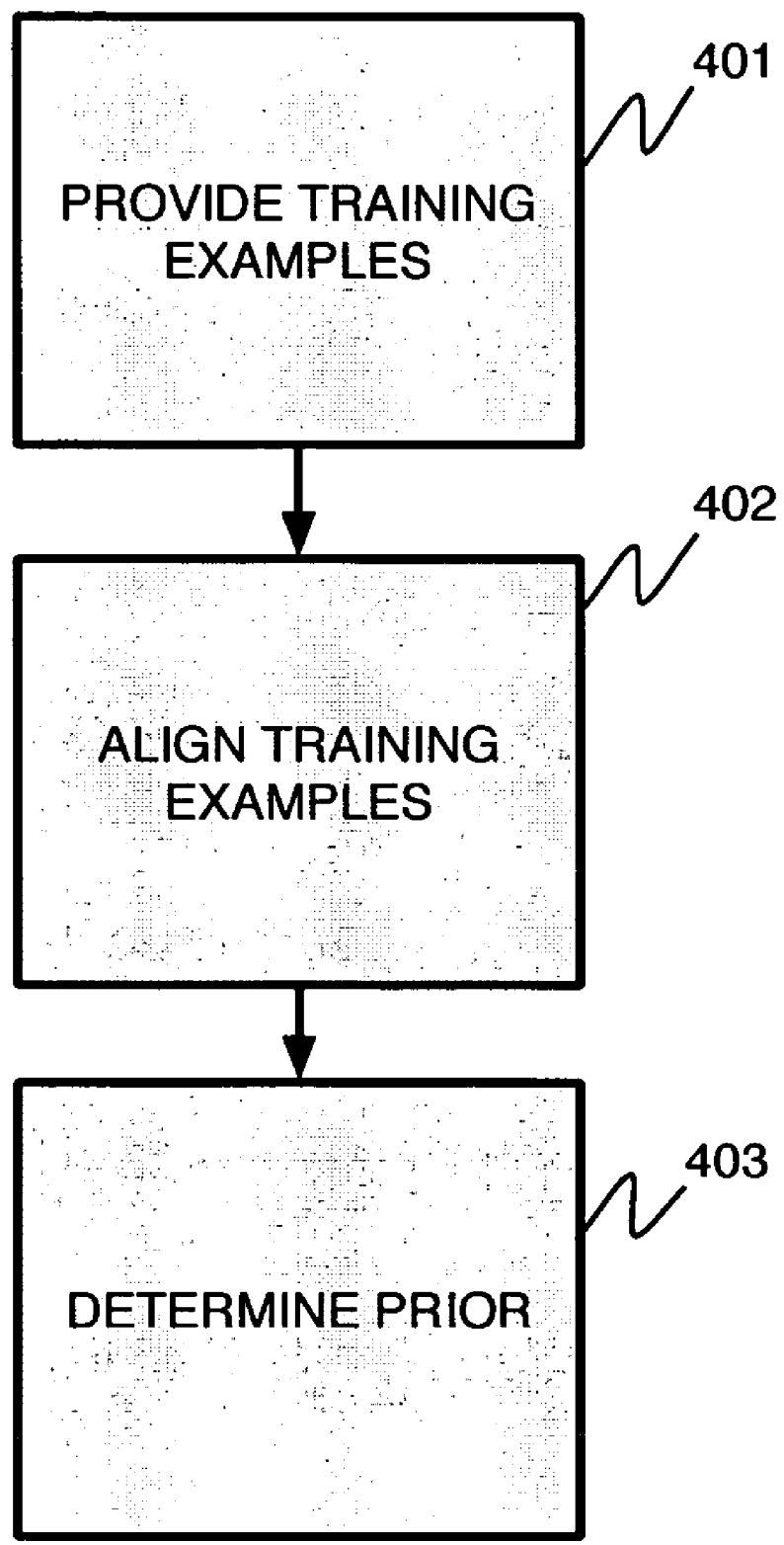
FIG. 4 is a flow chart of a method for determining a prior according to an embodiment of the present disclosure.

Introduction shape-driven modules are a valuable element to the segmentation process. Such action involves the definition/recovery of a structure to represent the prior knowledge and the introduction of constraints that guide the segmentation process towards solutions that respect the prior knowledge or prior. The prior can define a manifold of solutions and the segmentation determines the most probable solution according to the image data within this manifold. Building an Implicit Shape Model (FIG. 1, 101):

Selecting a representation for the prior knowledge is an important component when introducing such constraints. In a typical scenario one would like to recover a compact structure from a set of N training examples $[C_1, C_2, \ldots, C_N]$ to represent the prior. The training examples may be images of a representative object of interest. The structure should be able to describe the variability of the training examples. Registration is needed within such process. Referring to FIG. 4, a plurality of training examples are provided 401. The training examples are aligned to a common pose $[\hat{C}_1, \hat{C}_2, \ldots, \hat{C}_N]$ 402, and a meaningful compact representation of the examples is sought that can encode prior knowledge for the particular pose 403. Alignment of shapes is a problem in imaging and vision with numerous potential applications.

Implicit representations and distance transforms can be considered to represent shapes in a higher dimension. Registration can be performed on this space seeking for a transformation that aligns the implicit representation of the source with the representation of the target. Global error metrics like sum of squared differences as well as maximization of the mutual information in the space of implicit representations can be used to recover a parametric model that describes the displacement between the source and the target. Local deformations can be accounted for in the space of implicit representations using either optical flow constraints or free-from-deformations.

Introducing the prior knowledge within level set methods, needs the definition of a model. Cloud of points is an example of a technique to represent such knowledge in a simplistic manner. Building an average shape across the examples of the training set can be sufficient to represent a prior. Such a technique may not capture variability and may not be convenient within a level set framework where the evolving interface is not represented using points. Within such framework, the definition of the prior within level set space may be considered. Consistency between the propagation technique/optimization framework and the form of the prior is meaningful. The objective is to recover from a set of examples $[\phi_1, \phi_2, \ldots, \phi_N]$, a compact representation to encode the prior where it is the level set representation of $\hat{C}_i$. Principle Component Analysis (PCA) can be applied to capture the statistics of the corresponding elements across the training examples. PCA refers to a linear transformation of variables that retains—for a given number n of operators—the largest amount of variation within the training data. Such technique needs a significant number of samples within the training set.

Consider creating a model that combines the structure of average shape and the ability to capture the variability of the learning set. According to an embodiment of the present disclosure, a model determines a most prominent shape as well as the confidence along the shape parts (see FIG. 3). When agreement between the training examples for a particular part of the object is present, then confidence should be high and the recovery of the object in the image should strongly respect the prior. When this is not the case, the prior constraint should be relaxed and the image information should be more important. The model implements a stochastic level set representation (see FIG. 1, 101) comprising a representative shape $\phi_m$ and a confidence map $\sigma_m$ both defined in the pixel level(s) according to:

$$p_s(\phi) = \frac{1}{\sqrt{2\pi}\,\sigma_m(s)} e^{-\frac{(\phi - \phi_m(s))^2}{2\sigma_m(s)^2}}.$$ EQ. 12

The representative shape should be a level set where the distance transform is considered as an embedding function leading to the constraint $|\nabla \phi_m|=1$. This constraint may be relaxed and a shape that best describes the training samples $[\phi_1, \phi_2, \ldots, \phi_N]$ (e.g., the average):

$$\phi_m = \frac{1}{N}\left[\sum_{i=1}^{N} \phi_i\right]$$

may be sought. Such modeling assumes independence across pixels. Towards the construction of the level set prior representation, consider solving the inference problem at the pixel level(s). Given a set of values $[\phi_1(s), \phi_2(s), \ldots, \phi_N(s),]$ recover a distribution $\phi_m(s), \phi_m(s)$ that better express the data.

Maximum posterior of this distribution along the training samples is equivalent with minimizing $$E(\phi_m(s), \sigma_m(s)) =$$ EQ. 13

$$-\log \sum_{i=1}^{N} p_s(\phi_i(s)) = \sum_{i=1}^{N}\left[\log(\sigma_m(s)) + \frac{(\phi_i - \phi_m(s))^2}{2\sigma_m(s)^2}\right]$$

where some constant terms were omitted. One can define such criterion on the image plane and recover the prior by seeking for the lowest potential of $$E(\phi_m, \sigma_m) = \sum_{i=1}^{N} \int\!\!\int_\Omega \left[\log(\sigma_m) + \frac{(\phi_i + \phi_m)^2}{2\sigma_m^2}\right] d\Omega$$ EQ. 14

Natural objects are composed of local segments and articulations. Such items (articulations) could lead to low confidence segments when building the considered model. While the motion of such components is not regular, in a local level, the confidence of the model is expected to be smooth. The object can be decomposed in segments that are solid and $\sigma_m$ is smooth along these segments or within a small neighborhood system in the image plane.

Smoothness terms may be used in considering optimization problems. The objective function is not convex and exhibits a large number of local minima. Furthermore, such problem may be ill posed since the number of constraints is lower than the number of unknown variables. A technique to overcome this limitation includes penalizing the spatial derivatives of the field to be recovered ($\sigma_m$):

$$E(\phi_m, \sigma_m) =$$ EQ. 15

$$\alpha \sum_{i=1}^{N} \int\!\!\int_\Omega \left[\log(\sigma_m) + \frac{(\phi_i + \phi_m)^2}{2\sigma_m^2}\right] d\Omega + \int\!\!\int_\Omega \psi(\nabla \sigma_m) d\Omega$$

where $\Psi(u,v)$ is a regularization function. Simple selection for $\Psi$ involves a variant of the error-two norm:

$$E(\phi_m, \sigma_m) = \alpha \sum_{i=1}^{N} \int\!\!\int_\Omega \left[\log(\sigma_m) + \frac{(\phi_i + \phi_m)^2}{2\sigma_m^2}\right] d\Omega +$$ EQ. 16

-continued $$\int\int_\Omega\left(\left(\frac{\partial}{\partial x}\sigma_m\right)^2+\left(\frac{\partial}{\partial y}\sigma_m\right)^2\right)d\Omega$$

Calculus of variations and a gradient descent method can be used to recover the solution for the prior model $(\phi_m,\sigma_m)$ The last constraint to be accounted for is related to $\phi_m$. Given the form of training examples (level set representations with distance transforms as embedding function), a model $\phi_m$ may be determined in this manifold. Constrained optimization of this functional can be done using Lagrange multipliers and a gradient descend method. Given the form of constraints, the conditions that guarantee the validity of Lagrange theorem are satisfied may not be assumed. Furthermore, the number of unknown variables of the system is too high leading to an unstable system. Such limitations may be overcome through the use of an augmented Lagrangian function.

Figure 3:
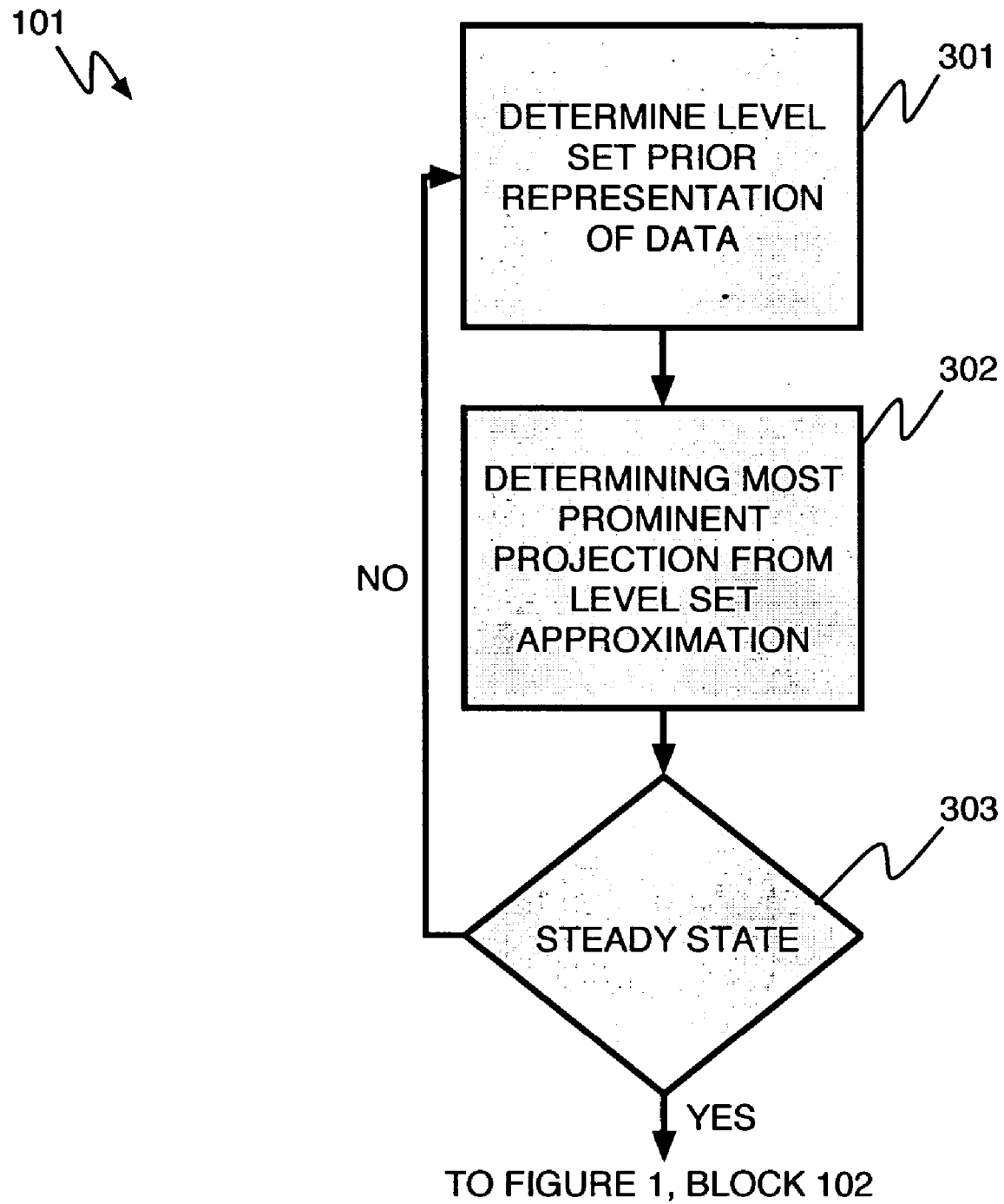
FIG. 3 is a flow chart of a method for determining a shape model according to an embodiment of the present disclosure.

Referring to FIG. 3, to account for the distance function constraint, the problem may be de-coupled into stages; an optimal data-driven solution can be recovered that can explain the training set 301; and the closest projection of such solution to the manifolds of distance transforms may be found 302. Blocks 301 and 302 alternate until the system reaches a steady-state solution 303. The calculus of variations of the objective function $E(\phi_m,\sigma_m)$ can provide a flow that deforms an initial level set function towards a representative model $(\phi_m)$ and recover the confidence measures $(\sigma_m)$ of the model 104.

$$\frac{d}{d\tau}\phi_m = \alpha\sum_{i=1}^{N}\frac{(\phi_i-\phi_m)}{2\sigma_m^2} \qquad \text{EQ. 17}$$

$$\frac{d}{d\tau}\sigma_m = \alpha\sum_{i=1}^{N}\left[-\frac{1}{\sigma_m}+\frac{(\phi_i-\phi_m)^2}{\sigma_m^3}\right]-\left[\frac{\partial^2}{\partial x\partial x}\sigma_m+\frac{\partial^2}{\partial y\partial y}\sigma_m\right]$$

Such flow will lead to a level set model $\phi_s$ that is close to the data but doesn't respect the constraint of having a distance transform as embedding function. One can consider the closest projection of the current state of $\phi_s$ to the space of distance transforms. Prior art in doing that involve several techniques. Some of them need the extraction of the level set, while others can perform the same task directly on the implicit representation space. Consider a PDE to recover such projection:

$$\frac{d}{d\tau}\phi_m = \text{sgn}(\phi_m^0)(1-|\nabla\phi_m|) \qquad \text{EQ. 18}$$

$\phi_m^0$ is the representation recovered from the data driven component that is to be projected to the space of distance functions.

Consider an iterative technique that recovers a best model and projects to the manifold of distance transforms in a sequential manner. Decisions on the alternation between steps can be taken according to the average distance of the model $$\left[d=\frac{1}{|\Omega|}\int\int_\Omega|\nabla\phi_m|d\Omega\right]$$

an ideal distance transform. To avoid stability problems, the variability estimates can be replaced with $[\sigma_m=1+\hat{\sigma}_m]$ and $\hat{\sigma}_m$ can be sought, constrained to be strictly positive in the pixel level.

The advantages of such a prior model include encoding in a natural form prior knowledge within implicit representations, providing straightforward techniques for the estimation of geometric properties, dealing with multi-component objects and determining the prior from a small set of training examples. Such encoding can support meaningful comparisons between the evolving interface and the model. A minimal difference between the prior $(\phi_m)$ and the evolving interface $\phi$ corresponds to a solution that respects the prior. Introducing Prior Knowledge (FIG. 1, 102):

The assumption that all training examples are registered in a common pose was considered during model construction (see FIG. 4). Such assumption is needed to recover a meaningful model. Knowledge-based segmentation needs to address the same concern. Objects in the image can have different scale, orientation, etc., compared to the prior model. The parameters of the transformation between these two elements are unknown, while its form can be known.

For similarity-invariant case, where the object to be detected is a similarity transformation of the model combined with some local deformations, a manifold of acceptable solutions is defined to be the set of a parametric set of transformations of the prior model. Consider the similarity case, since the effect of these transformations to distance transforms can be predicted.

For a static prior, in an abstract level, a constraint is introduced that forces the evolving interface in all instances to belong to this manifold. Such action leads to the recovery of an image structure that has the same geometric properties with the prior. Such a constraint should be based on a meaningful comparison between the prior $(\phi_m)$ and the evolving implicit representation $\phi(;\tau)$. This constraint in a general form may be written as:

$$\phi(;\tau)=g(\phi_m(A(;\tau))) \qquad \text{EQ. 19}$$

where g is a morphing function to be defined and $A(;\tau)=(S,\Theta,T)$ is a family of similarity transformations that involve a translation vector T, a rotation angle $\Theta$ and a scale factor S. Distance functions are invariant to translation and rotation. Therefore, considering the sub-case of rigid transformations, the above condition may be simplified to:

$$\phi(;\tau)=\phi_m(A(;\tau)) \qquad \text{EQ. 20}$$

The minimization of the error to norm between the evolving representation and the rigid variant of the model can be now considered to impose the constraint;

$$E(\phi,A)=\int\int_\Omega H_\alpha(\phi)(\phi-\phi_m(A))^2 d\Omega \qquad \text{EQ. 21}$$

where recovery of a level set is sought that is like the prior model after translating and rotating it. Such knowledge-based term accounts for the interior object part. The selected prior representation encodes such knowledge in the exterior part too. In particular, the prior term is more accurate when defined close to the average shape. The use of distance transforms as embedding function in the level set representations will preserve the prior information within a certain distance from the average shape. However, such information will become less and less discriminative when moving away from the zero level set. A modification of the Heaviside function can account for shape knowledge on the exterior of the object:

$$E(\phi,A) = \int \int_\Omega H_\alpha(\phi+\epsilon)(\phi-\phi_m(A))^2 d\Omega \qquad \text{EQ. 22}$$

where $\epsilon$ is a positive constant that shifts the prior term contribution up to iso-phote $\epsilon$. The correctness of the prior term is a function of the distance from the zero-level set. It may be assumed that estimating and imposing the prior within the vicinity of this iso-phote is more meaningful. Propagation of the curve takes place on this iso-phote and therefore, the static prior can be considered in the following form:

$$E(\phi,A) = \int \int_\Omega \delta_\epsilon(\phi)(\phi-\phi_m(A))^2 d\Omega \qquad \text{EQ. 23}$$

where $\epsilon \gg \alpha$. The calculus of variations and a gradient descent method can be considered to recover the unknown transformation A and extract an image structure (according to $\phi$) that follows the shape properties of the prior.

Distance transforms are not invariant to scale variations. To account for this property, the morphing function between the prior representation and the evolving one may be redefined. The application of a scale operator to a contour will scale accordingly the distance transform embedding function. Assuming an evolving contour $\partial R_1$ and a one been recovered after applying a scale operator $S[\partial R_2 = S\partial R_1]$, it can be shown that the following relation holds for their level set distance transform representations $[S\phi_1 = \phi_2]$. Such a condition can be integrated with the effect of translation and rotation leading to a similarity invariant condition between the level set of the prior and the evolving one:

$$S\phi(;\tau) = \phi_m(A(;\tau)) \qquad \text{EQ. 24}$$

The sum of square differences between the actual interface $\phi$ and the model $\phi_m$ after being morphed can be considered to be as objective function;

$$E(\phi,A) = \int \int_\Omega \delta_\epsilon(\phi)(S\phi-\phi_m(A))^2 d\Omega \qquad \text{EQ. 25}$$

This criterion evolves the level set function towards a rigid transformation of the model. To this end, the calculus of variations and a gradient descent method is a prominent method to recover $\phi$ $$\frac{d}{d\tau}\phi = -2\underbrace{\delta_\epsilon(\phi)S(S\phi - \phi_m(\mathcal{A}))}_{\text{shape consistency force}} - \underbrace{\left[\frac{\partial}{\partial \phi}\delta_\epsilon(\phi)\right](S\phi - \phi_m(\mathcal{A}))^2}_{\text{area force}} \qquad \text{EQ. 26}$$

This flow includes a shape consistency force that updates the interface towards a better local much with the prior and a force that aims at updating the level set values such that the region on which the objective functions is evaluated ($-\epsilon,\epsilon$) becomes smaller and smaller in the image plane.

To better understand the influence of this force, consider a negative $\phi$ value, within the range of ($-\epsilon,\epsilon$):

$$\phi < 0 \rightarrow -\frac{\partial}{\partial \phi}\delta_\epsilon(\phi) = \qquad \text{EQ. 27}$$

$$\frac{\pi}{2\epsilon^2}\sin\left(\frac{\pi\phi}{\epsilon}\right) < 0 \rightarrow -\left[\frac{\partial}{\partial \phi}\delta_\epsilon(\phi)\right](S\phi - \phi_m(\mathcal{A}))^2 < 0 \rightarrow$$

$$|\phi^\tau| < |\phi^{\tau+1}| \rightarrow \delta_\epsilon(\phi^\tau) > \delta_\epsilon(\phi^{\tau+1}) \rightarrow E(\phi^\tau, \mathcal{A}) > E(\phi^{\tau+1}, \mathcal{A})$$

Therefore, such force does not change the position of the interface since the sign of the implicit representation at each pixel is preserved. It affects only the form of the implicit function such that the area on which the objective function is evaluated decreases. Such a force may be ignored since it does not have a meaningful interpretation in the process of imposing the prior knowledge.

Consider the calculus of variations for the parameters of the transformation A leading to:

$$\frac{d}{d\tau}\theta = -2\int\int_\Omega \delta_\epsilon(\phi)(S\phi - \phi_m(\mathcal{A}))\left(-\nabla\phi_m(\mathcal{A}) \cdot \frac{\partial}{\partial\theta}\mathcal{A}\right)d\Omega \qquad \text{EQ. 28}$$

$$\frac{d}{d\tau}S = -2\int\int_\Omega \delta_\epsilon(\phi)(S\phi - \phi_m(\mathcal{A}))\left(-\phi - \nabla\phi_m(\mathcal{A}) \cdot \frac{\partial}{\partial S}\mathcal{A}\right)d\Omega$$

$$\frac{d}{d\tau}\begin{bmatrix} \mathcal{T}x \\ \mathcal{T}y \end{bmatrix} =$$

$$-2\int\int_\Omega \delta_\epsilon(\phi)(S\phi - \phi_m(\mathcal{A}))\left(-\nabla\phi_m(\mathcal{A}) \cdot \frac{\partial}{\partial\begin{bmatrix}\mathcal{T}x\\\mathcal{T}y\end{bmatrix}}\mathcal{A}\right)d\Omega$$

where Tx, Ty are the two components of the translation vector. The registration parameters between the evolving interface and the model are recovered in a global manner using regional information.

Least squares methods can be sensitive to noise and outliers. The use of robust estimators can be considered to overcome these constraints when recovering the registration between the interface and the prior:

$$E(\phi,A) = \int \int_\Omega \delta_\epsilon(\phi)\rho(S\phi - \phi_m(A))d\Omega \qquad \text{EQ. 29}$$

where $\rho$ is a robust error norm. Additional visual-driven terms may be considered, including attraction to the boundaries and separation between object and background according to their intensity properties.

The framework can translate a soft constraint (representation of the prior using a stochastic level set) to a hard constraint for knowledge-based segmentation. The prior term includes a confidence map ($\sigma_m$). It can be expected that areas with strong prior, should be recovered accurately in the image. In areas where the confidence of the model is questionable, image information has a more dominant role than the prior in the segmentation process.

A stochastic prior may be used to model the joint space of evolving interface and its transformation to the prior model using a probability density function. Let $[p(\phi,A|\phi_m)]$ be the prior distribution of the transformation given the model $\phi_m$. Such a distribution is unknown, varies across different objects and cannot be recovered in the more general case. However, Monte-Carlo sampling or other techniques can be used to recover such a distribution when empirical evidence is available. Consider a Bayesian formulation for this density $$p(\mathcal{A}, \phi | \phi_m) = \frac{p(\phi_m | \mathcal{A}, \phi)}{p(\phi_m)}p(\phi, \mathcal{A}) = \frac{p(\phi_m(\mathcal{A}) | \phi)}{p(\phi_m)}p(\phi, \mathcal{A}) \qquad \text{EQ. 30}$$

The constant term $\phi_m$ may be ignored and it may be assumed that the joint space of interfaces and their transformations is uniform. However, such assumption is considered in the absence of knowledge for the properties of the object to be recovered, including the pose of the object, scale variations, etc. Recovering the optimal interface and the transformation is equivalent to finding the maximum posterior $p(\phi_m(A)|\phi)$ that is equivalent with finding the extremum of:

$$p(\phi_m(\mathcal{A})|\phi) = \prod_{\omega \in \Omega} p(\phi_m(\mathcal{A}(\omega))|\phi(\omega)) \qquad \text{EQ. 31}$$

where $\omega$ is an image location, $p(\phi_m(A(\omega))|\phi(\omega))$ is the stochastic prior in this location and independence across pixels was considered. The conversion of the evolving interface $\phi$ to the pose similar to the one recorded in the prior model $\phi_m$ is also considered. To this end, the scale factor S is to be accounted for, leading to the following form for the posterior:

$$p(\phi_m(\mathcal{A})|\phi) = \prod_{\omega \in \Omega} p(\phi_m(\mathcal{A}(\omega))|S\phi(\omega)) \qquad \text{EQ. 32}$$

Scale variations cause predictive changes in the distance transform level set representations as explained earlier. The pixel-defined prior distributions [$p_\omega(\ )$] are known from the modeling phase and solving the inference problem is equivalent with finding the lowest potential of the –log function, or:

$$E(\phi, \mathcal{A}) = -\log\left[\prod_{\omega \in \Omega} p(\phi_m(\mathcal{A}(\omega))|S\phi(\omega))\right] = \qquad \text{EQ. 33}$$

$$-\int\int_\Omega \log(p_\omega(S\phi(\omega)))d\Omega$$

Using the known Gaussian properties of the pixel-defined prior distributions, one can recover the following analytical expression for the objective function:

$$E(\phi, \mathcal{A}) = \int\int_\Omega \left(\log(\sigma_m(\mathcal{A})) + \frac{(S\phi - \phi_m(\mathcal{A}))^2}{2\sigma_m(\mathcal{A})^2}\right)d\Omega \qquad \text{EQ. 34}$$

where constant terms have been omitted. Such an objective function includes a term that discourages the recovery of a transformation A that projects the evolving interface to model areas with low confidence [large $\sigma m(A)$] and a term that couples local propagation and estimation with the following objectives; (i) recover a transformation that aligns the evolving interface with the prior and (ii) evolve the interface so given the transformation it becomes like the prior. Such term has similar conceptual interpretation with the one used to introduce the static prior, while being able to account for model confidence. The projection error $(S\phi-\phi_m(A))^2$ is weighted according to the model confidence $\sigma_m(A)$.

Within such optimization framework the error for deviating from the model in areas with low confidence (high $\sigma_m(A)$) is downgraded (according to $\sigma_m(A)$).

Consequently such areas become less important in the process of imposing the prior and recovering the transformation. Further, the model deals in an implicit manner with outliers in the process of shape enforcement within the segmentation process.

The resulting criterion though is defined in the entire image plane. The definition of the prior is consistent mainly around the object region, and needs to constrain the objective function within the structure of interest.

$$E(\phi, \mathcal{A}) = \int\int_\Omega \delta_\varepsilon(\phi)\left(\log(\sigma_m(\mathcal{A})) + \frac{(S\phi - \phi_m(\mathcal{A}))^2}{2\sigma_m(\mathcal{A})^2}\right)d\Omega \qquad \text{EQ. 35}$$

The calculus of variations within a gradient descent method can provide the lowest potential of the cost function. Two unknown variables are to be recovered, the object position (form of function $\phi$)

$$\frac{d}{d\tau}\phi = -\underbrace{\left[\frac{\partial}{\partial\phi}\delta_\varepsilon(\phi)\right]\left(\log(\sigma_m(\mathcal{A})) + \frac{(S\phi - \phi_m(\mathcal{A}))^2}{\sigma_m(\mathcal{A})^2}\right)}_{\text{area force}} - \qquad \text{EQ. 36}$$

$$\underbrace{2\delta_\varepsilon(\phi)S\frac{(S\phi - \phi_m(\mathcal{A}))}{\sigma_m(\mathcal{A})^2}}_{\text{shape consistency force}}$$

and the transformation between the object and the prior:

$$\frac{d}{d\tau}\Theta = - \qquad \text{EQ. 37}$$

$$\int\int_\Omega \delta_\varepsilon(\phi)\frac{(S\phi - \phi_m(\mathcal{A}))\left(-\frac{\partial}{\partial\Theta}\phi_m(\mathcal{A})\right)\sigma_m(\mathcal{A}) + (\sigma_m(\mathcal{A})^2 - (S\phi - \phi_m(\mathcal{A}))^2)\frac{\partial}{\partial\Theta}\sigma_m(\mathcal{A})}{\sigma_m(\mathcal{A})^3}d\Omega$$

$$\frac{d}{d\tau}S =$$

$$-\int\int_\Omega \delta_\varepsilon(\phi)\frac{(S\phi - \phi_m(\mathcal{A}))\left(\phi - \frac{\partial}{\partial S}\phi_m(\mathcal{A})\right)\sigma_m(\mathcal{A}) + (\sigma_m(\mathcal{A})^2 - (S\phi - \phi_m(\mathcal{A}))^2)\frac{\partial}{\partial S}\sigma_m(\mathcal{A})}{\sigma_m(\mathcal{A})^3}d\Omega$$

$$\frac{d}{d\tau}\begin{bmatrix}Tx\\Ty\end{bmatrix} =$$

$$-\int\int_\Omega \delta_\varepsilon(\phi)\frac{(S\phi - \phi_m(\mathcal{A}))\left(-\frac{\partial}{\partial\begin{bmatrix}Tx\\Ty\end{bmatrix}}\phi_m(\mathcal{A})\right)\sigma_m(\mathcal{A})}{\sigma_m(\mathcal{A})^3}d\Omega -$$

$$\int\int_\Omega \delta_\varepsilon(\phi)\frac{(\sigma_m(\mathcal{A})^2 - (S\phi - \phi_m(\mathcal{A}))^2)\frac{\partial}{\partial\begin{bmatrix}Tx\\Ty\end{bmatrix}}\sigma_m(\mathcal{A})}{(\sigma_m(\mathcal{A})^3)}d\Omega$$

where the partial derivatives of $\phi(A)$, $\sigma_m(A)$ with respect to the transformation parameters can be recovered using the chain rule as done in the case with the static prior. The area force has the same interpretation as the one presented in the case of static prior and therefore can be ignored. Such stochastic prior can be used to recover a structure of interest that accounts for the confidence of the prior in an elegant probabilistic manner.

Both terms refer to an additional component for imposing prior knowledge on the segmentation and do not account for the visual properties of the object.

Figure 5:
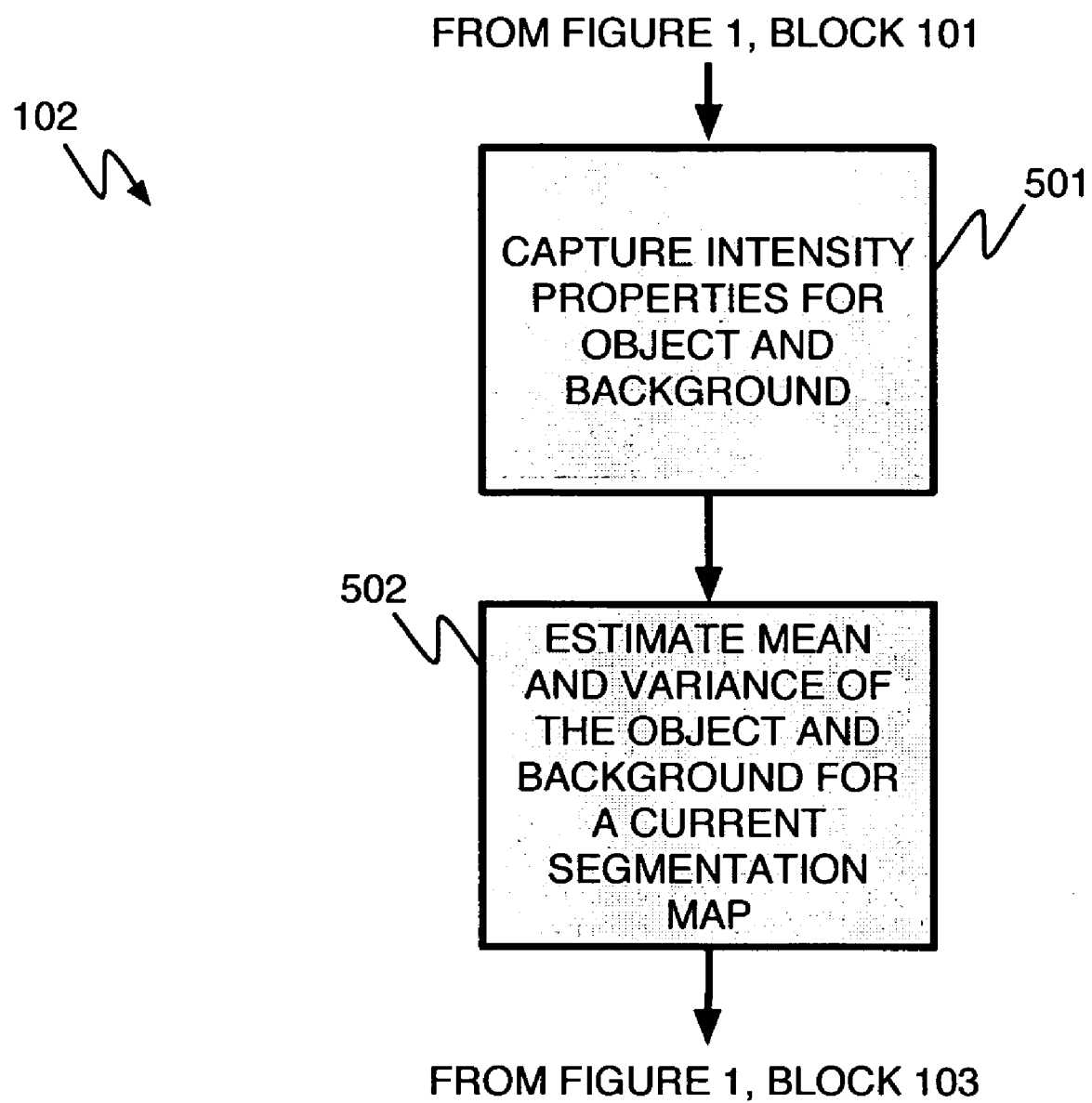
FIG. 5 is a flow chart of a method for a level set determination implementing a prior according to an embodiment of the present disclosure.

To introduce the prior (see FIG. 5), consider a bi-modal partition that refers to the object of interest and the background. The geodesic active region model can account for such partition. Visual discontinuities (e.g., strong edges) are assumed in the image referring to the boundaries of the desired partition. Without loss of generality, Gaussian distributions can be used to capture the intensity properties of the object and the background 501. Parameters (e.g., mean, variance) of the object and background are estimated according to a latest segmentation map 502, using the empirical mean and variance:

$$E(\phi, \mathcal{A}) = \qquad \text{EQ. 38}$$

$$\omega_2 \underbrace{\int\int_\Omega \delta_\alpha(\phi) g(|\nabla I|)|\nabla \phi| d\Omega}_{boundary\ attraction} - \underbrace{\int\int_\Omega H_\alpha(\phi)\log(p_O(I))d\Omega}_{object\ visual\ properties} -$$

$$\underbrace{\int\int_\Omega (1 - H_\alpha(\phi))\log(p_B(I))d\Omega}_{background\ visual\ properties} +$$

$$w_1 \underbrace{\int\int_\Omega \delta_\epsilon(\phi)\left(\log(\sigma_m(\mathcal{A})) + \frac{(S\phi - \phi_m(\mathcal{A}))^2}{2\sigma_m(\mathcal{A})^2}\right) d\Omega}_{prior\ shape\ knowledge}$$

where g is a monotonically positive decreasing function. One can further develop the Gaussian distributions to recover a more convenient form for the visual region-defined component. The calculus of variations can lead to a geometric flow that guides the propagation of the contour towards the object boundaries while respecting the prior (see FIG. 1, 103). Mixture models or non-parametric techniques can be also considered to capture the object and the background visual properties.

Towards fast implementation of the framework, consider a narrow band method, which evolves the level set representation in the vicinity of the latest position of the contour. Changes on the evolving contour will happen on the zero-level and then being propagated in the inwards and outwards direction. Such selection will also improve the performance of the shape prior term. This term is accurate around the average shape and become less accurate as it moves away from the zero-level of the prior. Therefore, the level set representation may be updated within the $[-\epsilon,\epsilon]$ iso-photes.

According to an embodiment of the present disclosure, a knowledge-based segmentation technique is implemented within a level set framework. A prior model is constructed and introduced. Towards the construction of the prior, to be consistent with the selected optimization framework considered, a stochastic level set representation is implemented. Such a model includes a distance transform embedding function (level set) and a confidence component. Such function is recovered through a constrained optimization approach. A set of training examples is considered in the level set space, using distance transforms as embedding functions. Then modeling is equivalent with recovering a representative level set distance function and smooth measurements of confidence at the pixel level. Such measurements aim to quantify the agreement of the training set at this particular location. To recover such a model the system and method alternate between a level set function that is close to the data is recovered and the most prominent projection of this function to the manifold of acceptable solutions is determined until convergence is reached. Prior knowledge is introduced in a gradual manner. Static hard constraints that force the segmentation solution to be a similarity transformation of the prior model are considered first. An objective function that accounts for the transformation as well as the position of the object in the image is defined and used to recover both the projection and the confidence.

Probabilistic principles are considered leading to a maximum posterior problem that incorporates the local variations of the model.

Having described embodiments for a variational level set system and method for shape-driven knowledge-based object detection, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for detecting an object in an image comprising:
   determining a shape model from aligned training examples;
   implementing the shape model as a stochastic prior within a level set framework for determining the object in the image, wherein the level set framework determines a projection of the object in the image and a confidence measure for each pixel along portions of the projection, the level set framework being constrained by the stochastic prior; and
   weighting a projection error according to the confidence measure, wherein the stochastic prior introduces the projection error into the level set framework for decreasing an importance of the stochastic prior in areas with reduced confidence.

2. The method of claim 1, wherein the training examples are aligned to a common pose.

3. The method of claim 1, wherein determining the shape model further comprises:
   determining a level set presentation of the object in the image;
   determining the projection as a most prominent shape in the image; and
   determining the confidence measure along portions of the most prominent shape.

4. The method of claim 3, further comprising determining a steady state shape model by alternately determining the level set presentation of the object and the projection and confidence measure.

5. The method of claim 1, wherein the projection and confidence measurement are defined in a pixel level of the image.

6. The method of claim 1, wherein the confidence measure is determined as a confidence map of the object, wherein the object is decomposed into the portions and a smoothness term is determined for each portion.

7. The method of claim 1, wherein the level set framework comprises:
   determining an intensity property for the object and a background in the image; and
   estimating mean and variance of the object and the background for a segmentation map.

8. The method of claim 1, wherein the projection evolves on a zero-level and propagates in an inwards and outwards direction to a boundary of the object.

9. A program storage medium readable by machine, tangibly embodying a program of instructions executable by the machine to perform method steps for detecting an object in an image, the method steps comprising:

determining a shape model from aligned training examples;

implementing the shape model as a stochastic prior within a level set framework for determining the object in the image, wherein the level set framework determines a projection of the object in the image and a confidence measure for each pixel along portions of the projection, the level set framework being constrained by the stochastic prior; and weighting a projection error according to the confidence measure, wherein the stochastic prior introduces the projection error into the level set framework for decreasing an importance of the stochastic prior in areas with reduced confidence.

10. The method of claim 9, wherein the training examples are aligned to a common pose.

11. The method of claim 9, wherein determining the shape model further comprises:

determining a level set presentation of the object in the image;

determining the projection as a most prominent shape in the image; and determining the confidence measure along portions of the most prominent shape.

12. The method of claim 11, further comprising determining a steady state shape model by alternately determining the level set presentation of the object and the projection and confidence measure.

13. The method of claim 9, wherein the projection and confidence measurement are defined in a pixel level of the image.

14. The method of claim 9, wherein the confidence measure is determined as a confidence map of the object, wherein the object is decomposed into the portions and a smoothness term is determined for each portion.

15. The method of claim 9, wherein the level set framework comprises:

determining an intensity property for the object and a background in the image; and estimating mean and variance of the object and the background for a segmentation map.

16. The method of claim 9, wherein the projection evolves on a zero-level and propagates in an inwards and outwards direction to a boundary of the object.

* * * * *